United States Patent
Sato et al.

(10) Patent No.: US 8,223,295 B2
(45) Date of Patent: Jul. 17, 2012

(54) OPTICAL ELEMENT, LIQUID CRYSTAL PANEL, AND LIQUID CRYSTAL DISPLAY

(75) Inventors: Satoshi Sato, Miyagi (JP); Satoshi Kawamura, Miyagi (JP); Masaharu Senoue, Miyagi (JP); Norimasa Furukawa, Tokyo (JP); Kenichi Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 11/659,914

(22) PCT Filed: May 23, 2006

(86) PCT No.: PCT/JP2006/310266
§ 371 (c)(1),
(2), (4) Date: Mar. 6, 2007

(87) PCT Pub. No.: WO2006/126549
PCT Pub. Date: Nov. 30, 2006

(65) Prior Publication Data
US 2007/0247567 A1  Oct. 25, 2007

(30) Foreign Application Priority Data

May 23, 2005  (JP) ............... P2005-149380
Sep. 30, 2005  (JP) ............... P2005-289336

(51) Int. Cl.
*G02F 1/1335* (2006.01)
(52) U.S. Cl. ................ 349/61; 349/62
(58) Field of Classification Search .......... 349/96, 349/104, 122, 61–62
See application file for complete search history.

(56) References Cited

U.S. PATENT DOCUMENTS 5,568,298 A * 10/1996 Mase et al. ............... 349/171
6,147,740 A  11/2000 Yoshida et al.
(Continued)

FOREIGN PATENT DOCUMENTS

EP  0 233 495  8/1987
(Continued)

OTHER PUBLICATIONS

International Search Report dated Jun. 25, 2009, for corresponding Patent Application EP 06746750.6.
(Continued)

*Primary Examiner* — Nathanael R Briggs
(74) *Attorney, Agent, or Firm* — K&L Gates LLP

(57) ABSTRACT

A liquid-crystal display that can inhibit the coloring of an image when a liquid-crystal panel is viewed from an oblique direction is provided. An optical filter is disposed at the forward end of a liquid-crystal panel and has different transmittances between a light component that travels in an oblique direction and a light component that travels in a direction normal to the multilayer, where both of the light components have a predetermined wavelength range. In the case where a wide-color-gamut light source, such as LEDs, is used as a light sources of a backlight unit, when the liquid-crystal panel is viewed from an oblique direction, the entire image area tends to be reddish, and the color temperature tends to decrease. In this case, the optical filter is configured such that the intensity of a visible red light component is selectively reduced such that the intensity of a visible blue light component is increased, thereby inhibiting the reddening of an image area when viewed from an oblique direction.

2 Claims, 17 Drawing Sheets

U.S. PATENT DOCUMENTS

| | | | |
|---|---|---|---|
| 2002/0080301 A1* | 6/2002 | Takahashi et al. | 349/61 |
| 2004/0036817 A1* | 2/2004 | Paukshto et al. | 349/56 |
| 2004/0091642 A1* | 5/2004 | Murakami et al. | 428/1.31 |
| 2004/0114114 A1* | 6/2004 | Yano et al. | 353/84 |
| 2006/0066803 A1* | 3/2006 | Aylward et al. | 349/158 |

FOREIGN PATENT DOCUMENTS

| | | |
|---|---|---|
| EP | 0 940 705 | 9/1999 |
| JP | 62-169145 | 7/1987 |
| JP | 62169145 | 7/1987 |
| JP | 04-037806 | 2/1992 |
| JP | 08-015525 | 1/1996 |
| JP | 08-015695 | 1/1996 |
| JP | 8015695 | 1/1996 |
| JP | 10-282498 | 10/1998 |
| JP | 10282498 | 10/1998 |
| JP | 11-024066 | 1/1999 |
| JP | 11024066 | 1/1999 |
| JP | 11-212073 | 8/1999 |
| JP | 11212073 | 8/1999 |
| JP | 11-271671 | 10/1999 |
| JP | 11271671 | 10/1999 |
| JP | 2003-066451 | 3/2003 |
| JP | 2003066451 | 3/2003 |
| JP | 2004-034806 | 2/2004 |
| JP | 2004-309618 | 11/2004 |
| JP | 2004309618 | 11/2004 |

OTHER PUBLICATIONS

Japanese Office Action for corresponding JP2005-289336 issued on Mar. 30, 2010.

* cited by examiner

——— ANGLE OF INCIDENCE OF 0°
------- LARGE ANGLE OF INCIDENCE

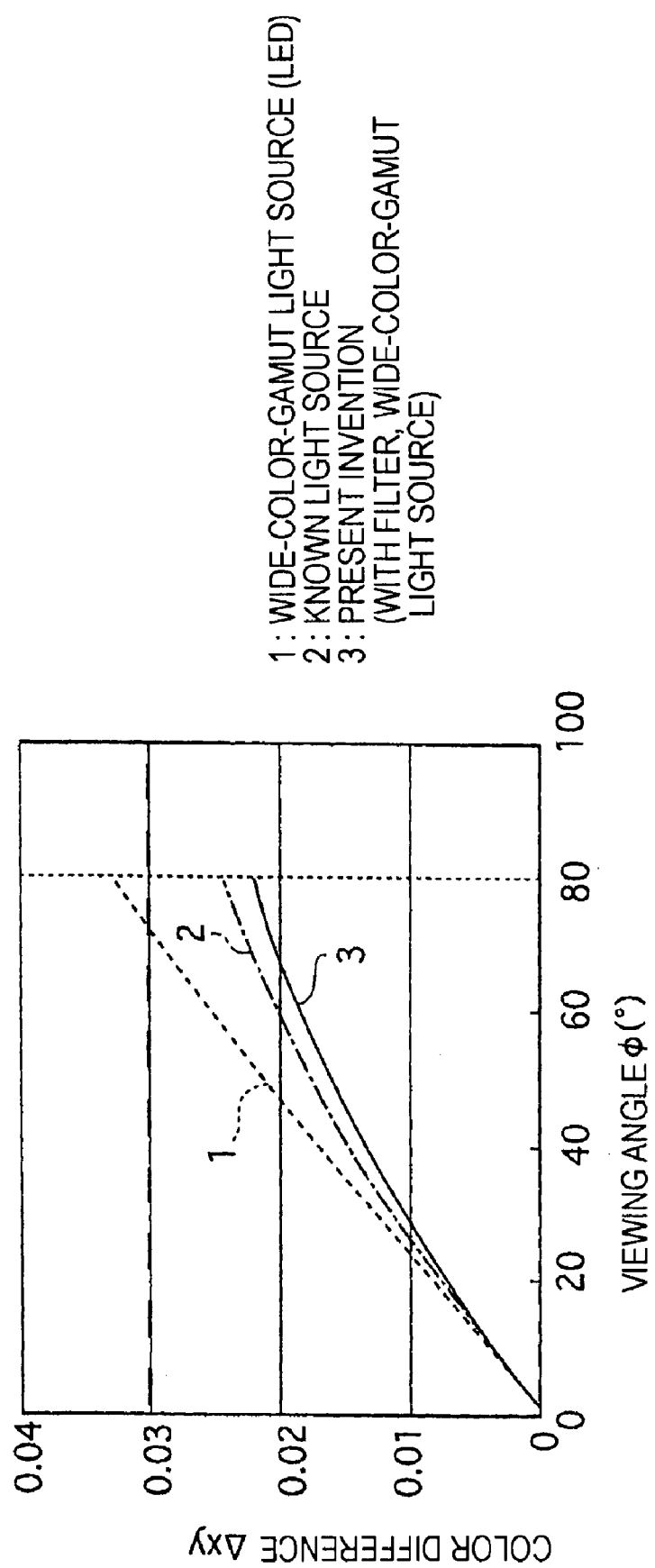

ANGLE OF INCIDENCE OF 0°

ANGLE OF INCIDENCE OF 60°

FIG. 15
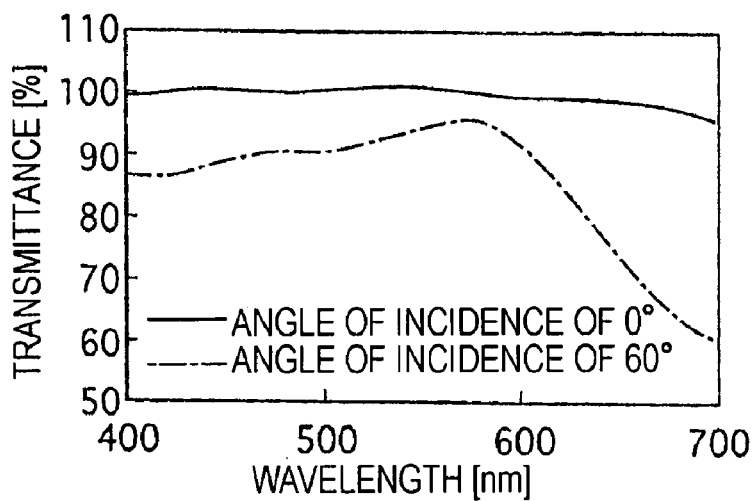
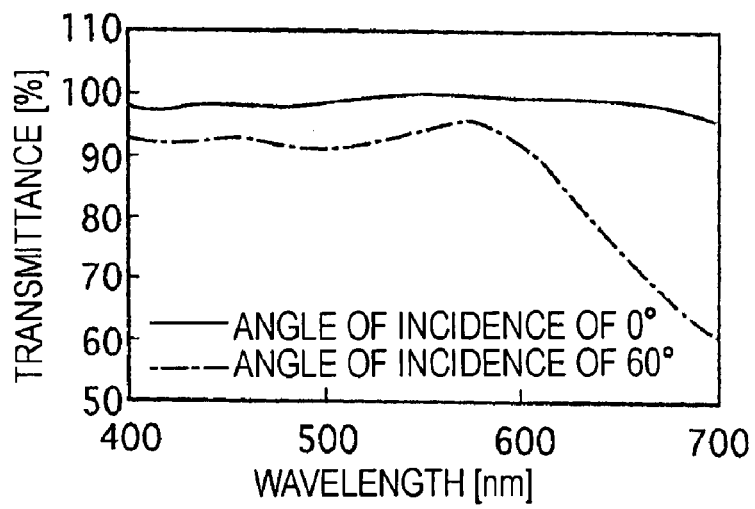
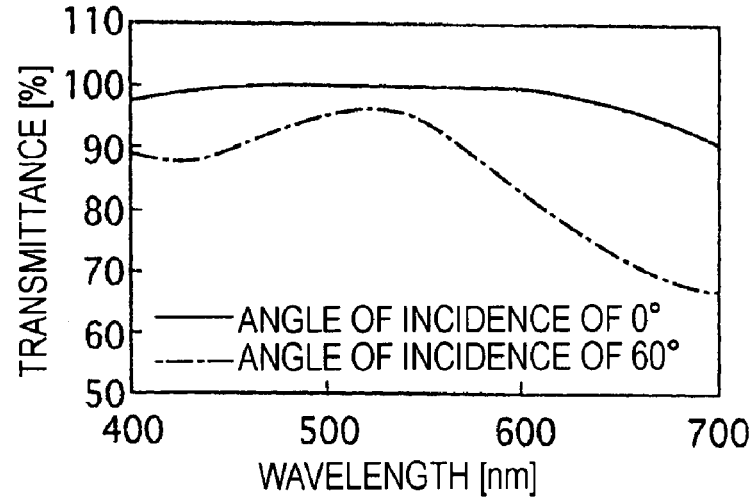

OPTICAL ELEMENT, LIQUID CRYSTAL PANEL, AND LIQUID CRYSTAL DISPLAY

CROSS REFERENCES TO RELATED APPLICATIONS

The present application claims priority to Japanese Patent Applications JP 2005-149380 filed on May 23, 2005 and JP 2005-289336 filed on Sep. 30, 2005, the entire contents of which are being incorporated herein by reference.

BACKGROUND

Liquid-crystal displays (LCDs) can achieve low-power consumption and are small and thin when compared with cathode-ray tubes (CRTs). Various sized LCDs are widely used in small apparatuses, such as mobile phones, digital cameras, personal digital assistants (PDAs), and large-sized LCD television sets.

Liquid-crystal displays are categorized into a transmissive type, a reflective type, and the like. In particular, transmissive liquid-crystal displays each include a liquid-crystal panel in which a liquid-crystal layer is disposed between a pair of transparent substrates and a backlight unit. Furthermore, a structure in which functional sheets, such as a diffusing sheet and a prismatic sheet, for irradiating the entire surface of the liquid-crystal panel with light from the backlight unit as a light source are disposed between the liquid-crystal panel and the backlight is generally used. Moreover, a structure in which a polarizer for polarizing light incident on the liquid-crystal layer and a color filter for displaying a color image are disposed on the liquid-crystal panel is generally known.

Various modes, such as a twisted nematic (TN) mode, a vertical alignment (VA) mode, and an in-plane switching (IPS) mode, are known as displaying methods for liquid-crystal displays. In any of these methods, the orientation of liquid-crystal molecules is changed in each pixel to control polarization or transmittance for light incident on the liquid-crystal layer, thereby displaying an intended image on the front surface of the liquid-crystal panel.

However, the polarization state of light coming through the liquid-crystal panel significantly depends on the orientation angle of the liquid-crystal molecules. Hence, the polarization state of light that is perpendicularly incident on the liquid-crystal panel different from the polarization state of light that is obliquely incident on the liquid-crystal panel, thus resulting in the difference in transmittance. Furthermore, retardation represented by the product of the refractive index anisotropy and the thickness of the liquid-crystal layer exhibits wavelength-dependent dispersion. The transmittance of light varies in response to a wavelength. As a result, the intensity of a light component having a specific wavelength range varies in response to the direction from which the liquid-crystal panel is viewed, thus changing the color temperature of an image. Furthermore, viewing-angle properties are disadvantageously degraded as follows: for example, display contrast and display colors vary in response to a viewing direction (see Japanese Unexamined Patent Application Publication No. 10-282498). In general, the intensity of blue often decreases and the intensity of red often increases, as a viewing direction becomes more oblique. Thus, the color temperature of an image tends to decrease.

To overcome the problems with the viewing-angle properties, in the known liquid-crystal display, a compensation film, such as a retardation plate or a color compensation plate, is disposed in a liquid-crystal panel to cancel the birefringence of a liquid-crystal layer, thereby improving the viewing-angle properties of the liquid-crystal panel (for example, see Japanese Unexamined Patent Application Publication Nos. 8-15695 and 11-24066). Furthermore, in some cases, a color-compensation function is imparted to a polarization component separating element for extracting a predetermined polarization component alone (see Japanese Unexamined Patent Application Publication No. 2004-309618).

However, the viewing-angle properties of the liquid-crystal panel are markedly affected by not only the birefringence of the liquid-crystal layer but also optical properties of a polarization plate and a color filter disposed in the liquid-crystal panel. A structure and combination of other constitutional elements other than the liquid-crystal panel, for example, luminance-improving films such as a diffusing sheet, a prismatic sheet, and a polarization component separating element result in different viewing-angle properties.

Thus, viewing-angle compensation focused on the birefringence of the liquid-crystal layer alone has limitations. The optical design of a compensation film that can compensate the effect of constitutional elements other than the liquid-crystal layer has increased complexity and difficulty, resulting in insufficient productivity.

In order to enhance the reproducibility of display colors, LED (light-emitting diode) backlights each including light-emitting diodes of RGB three primary colors as a light source and wide-color-gamut cold cathode fluorescent lamp (CCFL) backlights including improved phosphors are used in liquid-crystal displays. In this case, the emission spectrum of red of the light source shifts to longer wavelengths, thus causing significant reddening when the liquid-crystal panel is viewed in an oblique direction.

It is therefore desirable to provide an optical element that inhibits a change in the chromaticity of an image area when a liquid-crystal panel is viewed in an oblique direction; a liquid-crystal panel; and a liquid-crystal display.

SUMMARY

The present disclosure relates to an optical element that inhibits the coloring of an image area when viewed in an oblique direction and improves viewing-angle properties, a liquid-crystal panel, and a liquid-crystal display.

In an embodiment, an optical element having different transmittances between a light component that travels in an oblique direction and a light component that emerges from an outgoing-light-side face toward the front, both of the light components being emitted from the outgoing-light-side face of a liquid-crystal panel and having a predetermined wavelength range is provided.

The optical element includes a multilayer including a first-refractive-index material layer and a second-refractive-index material layer having a refractive index different from the refractive index of the first-refractive-index material layer. The optical element has the following properties: a transmittance for a light component that travels in an oblique direction is markedly different from a transmittance for a light component that travels in a direction normal to the multilayer, both of the light components having a predetermined wavelength range.

For example, in the case where the entire image area is reddish when the liquid-crystal panel is viewed from an oblique direction, the transmittance for a light component emerging from the outgoing-light-side face to an oblique direction and having a red wavelength range (a wavelength of 600 nm or more) is selectively reduced to eliminate a dependence of display colors on the viewing angle. Simultaneously or separately, the transmittance for part of a light component having a blue wavelength range (400 to 450 nm) is selectively increased, thereby resulting in the same effect and eliminating the dependence of the display colors on the viewing angle.

When the transmittance for a light component that travels toward the front is high, a reduction in the luminance of the display due to the optical element can be inhibited. With respect to the transmittance, the minimum transmittance of a visible light component having a wavelength between 400 nm and 650 nm is preferably 90% or more, and the average transmittance is preferably 95% or more.

In the case where a wide- or high-color-gamut light source is employed, the coloring of an image area due to a specific wavelength component when viewed from an oblique direction can be effectively inhibited, thus improving the viewing-angle properties without the degradation of the reproducibility of the display colors. The term "wide-color-gamut light source" defined here means a light source having an NTSC ratio of 90% or more.

In a liquid-crystal panel or a liquid-crystal display including the optical element having the above-described structure, it is possible to inhibit the coloring of an image area due to a specific color when viewed from an oblique direction and to easily achieve target viewing-angle properties without complex color-compensation design regarding the birefringence of an optical film, such as a liquid-crystal layer or a polarization plate, like the known color-compensation film and the like.

The optical element according to an embodiment may be disposed at an outgoing-light-side face (front face or the front side) or an incident-light-side face (back side) of the liquid-crystal panel. In particular, the liquid-crystal panel of this embodiment includes the optical element disposed an outgoing-light-side face of one of a pair of transparent substrates opposite each other with a liquid-crystal layer provided therebetween. Thus, it is possible to design an optimal optical element in response to the desirable quality of an image on the liquid-crystal panel.

In an exemplary structure in which the optical element according to an embodiment is disposed between the liquid-crystal panel and the backlight unit, the optical element may be disposed on the outgoing-light-side face of the backlight unit. Thereby, the intensity of a light component having a specific wavelength range from the light source is selectively reduced, and then resulting light component is guided to the subsequent elements. Furthermore, for example, the optical element may be integral with a polarization component separating element for extracting a predetermined polarization component alone, a diffusing sheet, a prismatic sheet, or another optical functional element. The optical element of this embodiment may be disposed at one position. Alternatively, for example, two or more optical elements of may be disposed at positions such that the optical functional element is disposed between the optical elements.

As described above, according to the embodiments, a change in the chromaticity of an image when the liquid-crystal panel is viewed from an oblique direction can be inhibited, thereby improving the viewing-angle properties.

Additional features and advantages of the present invention are described in, and will be apparent from, the following Detailed Description and the figures.

BRIEF DESCRIPTION OF THE FIGURES

FIG. 6 is a graph showing results of an experiment for making a comparison of a color difference Δxy between a known light source, a wide-color-gamut light source, and a wide-color-gamut light source including the optical filter 4.

FIG. 15 shows graphs each showing the relationship between the transmittance and the wavelength of a sample in each of EXAMPLES 4 to 6.

DETAILED DESCRIPTION

First Embodiment

Figure 1:
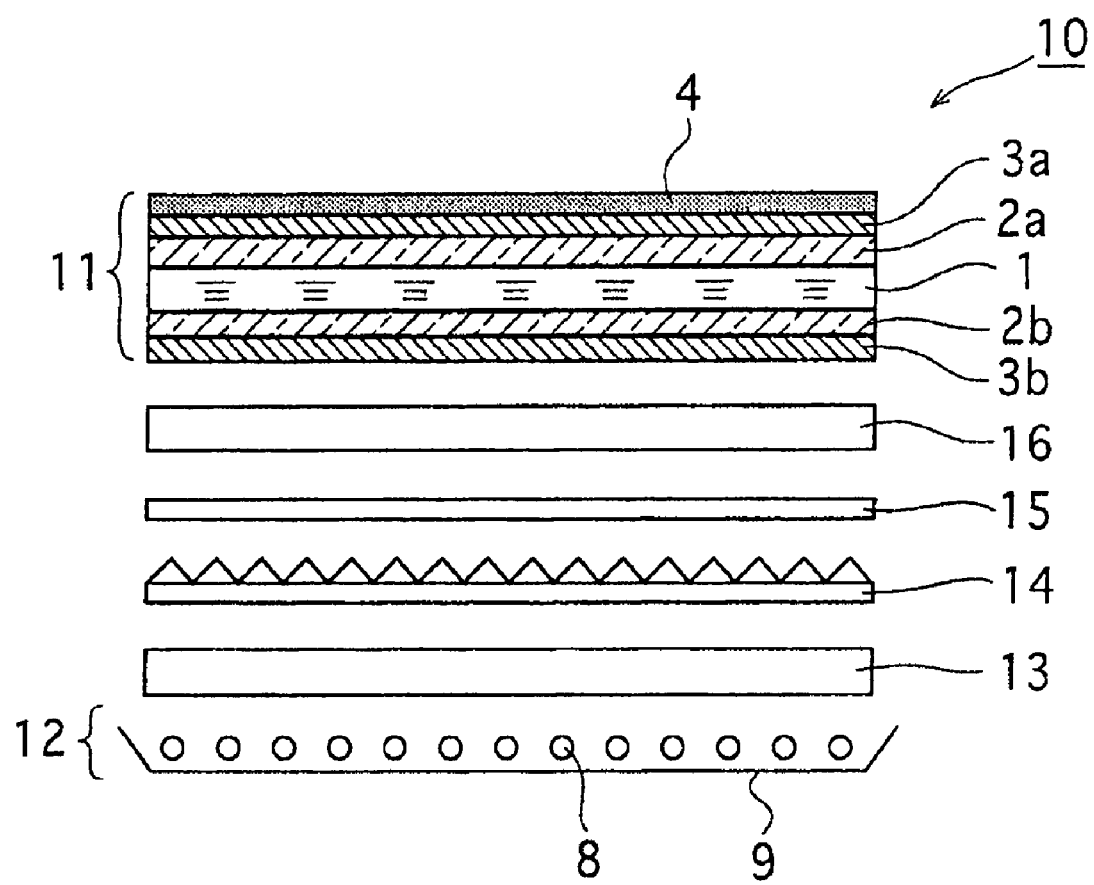
FIG. 1 is a schematic diagram of a liquid-crystal display 10 according to a first embodiment.

FIG. 1 is a schematic view of an example of the structure of a liquid-crystal display 10. The liquid-crystal display 10 shown in the figure is configured for a large-sized liquid-crystal-television set and includes a liquid-crystal panel (liquid-crystal cell) 11 and a backlight unit 12 disposed at the back side of the liquid-crystal panel 11 (lower side in FIG. 1). A diffusing plate 13, a prismatic sheet 14, a diffusing sheet 15, a polarization component separating element 16, and the like are appropriately combined and disposed between the liquid-crystal panel 11 and the backlight unit 12.

Figure 2:
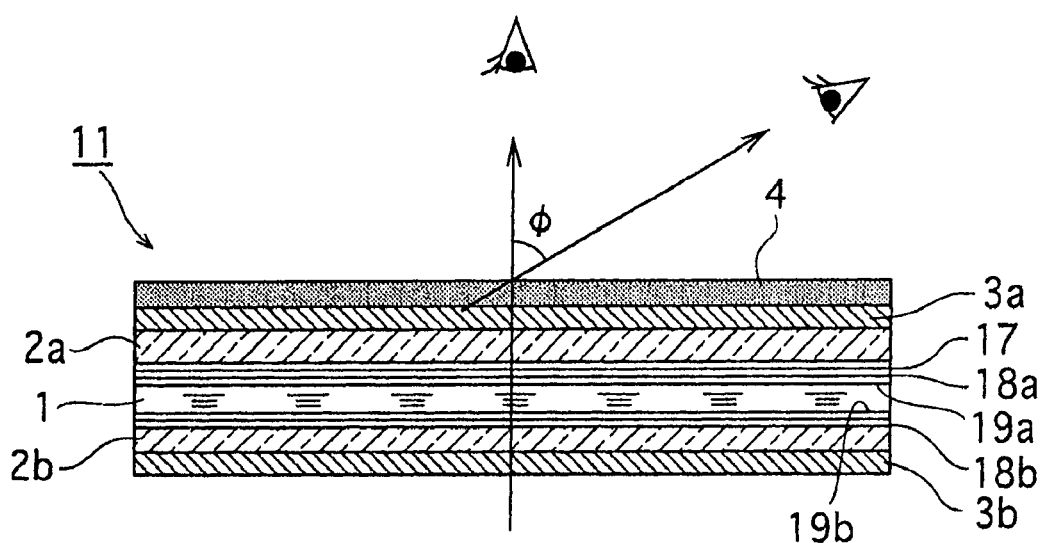
FIG. 2 is a cross-sectional view illustrating the structure of a liquid-crystal panel 11.

FIG. 2 is an enlarged cross-sectional view of the liquid-crystal panel 11. The liquid-crystal panel 11 includes a pair of transparent substrates 2a and 2b opposite each other with a liquid-crystal layer 1 provided therebetween, a pair of polarizing plates 3a and 3b disposed on the outer sides of the respective transparent substrates 2a and 2b, and an optical filter 4 disposed on the transparent substrate 2a, which is disposed at a outgoing light side, with the polarizing plate 3a provided therebetween. Optical compensating films, such as retardation films, may be disposed between the transparent substrate 2a and the polarizing plate 3a and between the transparent substrate 2b and the polarizing plate 3b.

The structure of the liquid-crystal layer 1 is not particularly limited. Nematic liquid-crystal materials which have positive dielectric anisotropy and in which when an electric field is applied, long axes of molecules are substantially parallelized with the direction of the electric field; and homeotropic liquid-crystal materials which have negative dielectric anisotropy and in which when an electric field is applied, long axes of molecules are substantially orthogonal to each other.

The transparent substrates 2a and 2b are glass substrates. Alternatively, the transparent substrates 2a and 2b may be polymer film substrates. A color filter 17, a transparent electrode film 18a, and an alignment film 19a are stacked on the inner side of the transparent substrate 2a in that order. A transparent electrode film 18b and an alignment film 19b are stacked on the inner side of the transparent substrate 2b in that order. With respect to the pair of the transparent electrode films 18a and 18b, for example, one of the transparent electrode films 18a and 18b serves as data lines, and the other serves as scanning lines. Each of the data line is orthogonal to a corresponding one of the scanning lines. Pixels are each formed at a corresponding one of the resulting intersections.

The optical filter 4 is an example of an "optical element" according to an embodiment. In the optical filter 4, with respect to light which is emitted from the backlight unit 12, comes through the transparent substrate 2a and the polarizing plate 3a, and has a specific wavelength range, the transmittance for light that travels from the liquid-crystal panel 11 toward the front direction is different from the transmittance for light that travels in a direction oblique to the front direction.

Figure 3:
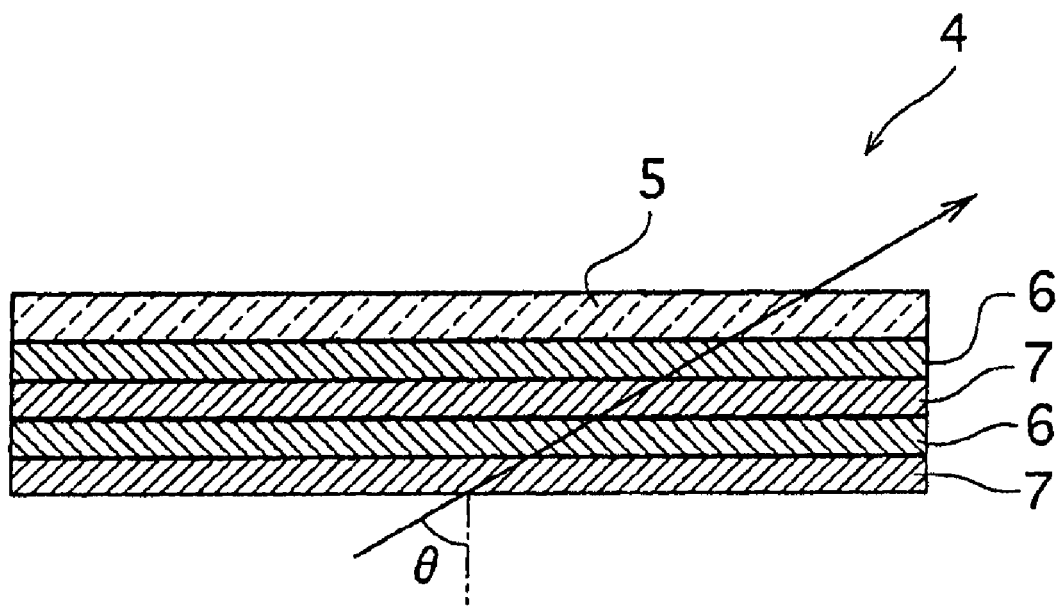
FIG. 3 is a cross-sectional view illustrating an optical filter 4.

FIG. 3 shows an example of the structure of the optical filter 4. The optical filter 4 has a dielectric multilayer structure in which high-refractive-index material layers 6 and low-refractive-index material layers 7 are alternately stacked on a transparent support 5 formed of a transparent plastic film (for example, a PET film) having a transmittance of 90% or more. The optical filter 4 has properties as follows: With respect to red light with a wavelength of 600 nm or more, the transmittance for the red light that travels in an oblique direction is lower than the transmittance for the red light that travels in the direction of normal to the dielectric multilayer. With respect to blue light with a wavelength between 400 and 450 nm, in contrast, the transmittance for the blue light that travels in an oblique direction is higher than the transmittance for the blue light that travels in the direction of normal to the dielectric multi layer.

The high-refractive-index material layer 6 corresponds to a "first-refractive-index material layer" of the present embodiment. The low-refractive-index material layer 7 corresponds to a "second-refractive-index material layer." Furthermore, another material layer having a refractive index different from refractive indices of these refractive-index material layers 6 and 7 may be stacked. The high-refractive-index material layer 6 and the low-refractive-index material layer 7 may be formed by a dry process, such as vacuum evaporation or sputtering, or a wet process such as dip coating. The lowermost low-refractive-index material layer 7 is bonded to the polarizing plate 3a with an adhesive layer (not shown) provided therebetween.

In this embodiment, the optical filter 4 has a low transmittance for a visible-light component with a wavelength of 600 nm or more among light components that emerge from the liquid-crystal panel 11 in an oblique direction. For example, the optical filter 4 includes the high-refractive-index material layer 6 formed of a $TiO_2$ film (refractive index: 2.4) and the low-refractive-index material layer 7 formed of a $SiO_2$ film (refractive index: 1.5). The high-refractive-index material layer 6 may be a $Nb_2O_5$ film, a $Ta_2O_5$ film, a $ZrO_2$ film, or the like in place of the $TiO_2$ film.

Figure 4A:
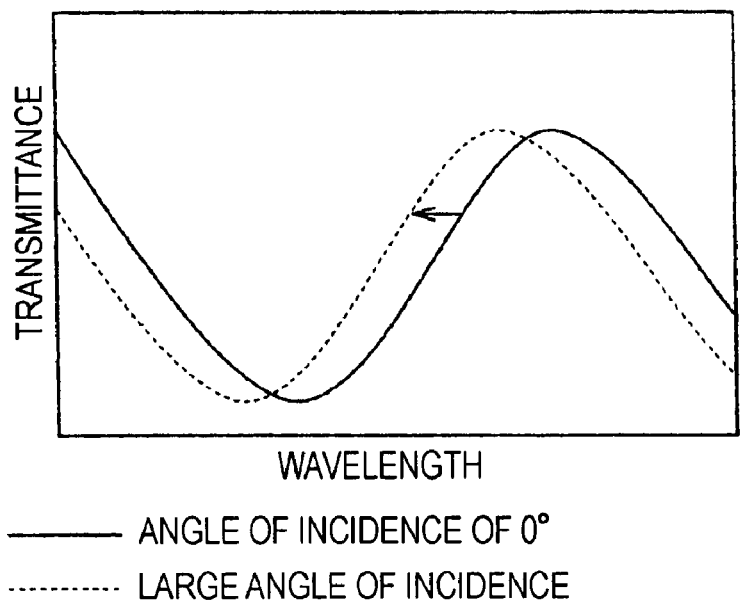
FIGS. 4A and 4B are each a graph showing the relationship between the transmittance and the wavelength, the graph illustrating an effect of the optical filter 4.

When a thin film composed of a material on a transparent substrate having a refractive index different from the refractive index of the material is formed, peak and bottom of transmittance are observed in a wavelength range according to the thickness of the film. This is attributed to the interference effect of light. When the angle of incidence of light shifts from 0° to higher angles with respect to a direction normal to the transparent substrate, the peak and bottom of transmittance shift toward shorter wavelengths as shown in FIG. 4A. Furthermore, the peak-to-peak distance and the peak width increase as the thickness decreases.

Figure 4B:
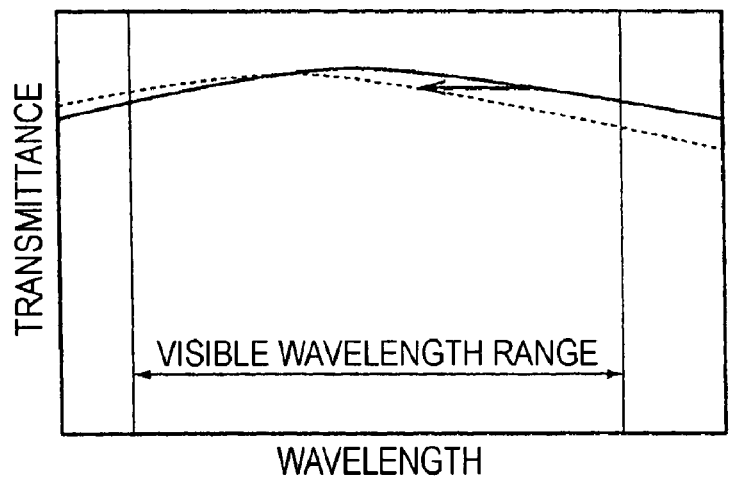

The present embodiments exhibit this phenomenon. As shown in FIG. 4B, the peak of transmittance is set within a visible wavelength range, and the bottom of transmittance is set so as to lie in longer wavelengths than the visible wavelength range. Thereby, an optical element in which reflectance for longer wavelengths in the visible wavelength range increases with increasing angle of incidence and in which reflectance for shorter wavelengths in the visible wavelength range decreases with increasing angle of incidence is produced. That is, the increase in reflectance for the longer wavelengths contributes to a reduction in reddening of an image, and a reduction in reflectance for the shorter wavelengths contributes to the inhibition of a variation in color temperature. Thus, properties in which the increase in reflectance for the loner wavelengths and the reduction in reflectance for the shorter wavelengths are simultaneously expressed are desirable. In some thickness designs, only one of the requirements is satisfied. In this case, the increase in reflectance for the longer wavelengths is desirably prioritized. This is because human eyes are generally sensitive to a change in reddening rather than a change in color temperature. Furthermore, a multilayer composed of a plurality of materials having different refractive indices is used. Thereby, transmittance at an angle of incidence of 0° can be set so as to be higher than the transmittance of the transparent substrate.

In this embodiment, the relationship between the angle of incidence θ and the transmittance for a light component having a wavelength of 600 nm or more and a light component having a wavelength between 400 to 450 nm can be mainly adjusted according to thicknesses, the number of layers stacked, a combination of the thicknesses, and the like of the refractive-index material layers 6 and 7. In this embodiment, the first high-refractive-index material layer 6 having a thickness of about 85 nm, the second low-refractive-index material layer 7 having a thickness of about 165 nm, the third high-refractive-index material layer 6 having a thickness of about 80 nm, and the fourth low-refractive-index material layer 7 having a thickness of about 75 nm are disposed on the transparent support 5.

In the optical filter 4 having the structure described above, the transmittance for light having a wavelength of 600 nm or more decreases as an angle of Incidence θ (FIG. 3) increases. In particular, the optical filter 4 in this embodiment has an average transmittance for a visible light component having a wavelength between 600 nm and 650 nm lower than the average transmittance for a visible light component having a wavelength of less than 600 nm, both of the visible light components being incident at an angle of 60°, as described below.

The backlight unit 12 is a direct backlight unit for emitting illuminating light from the rear side of the liquid-crystal panel 11. The backlight unit 12 includes a plurality of LED light sources 8 and a reflecting plate 9 covering the side and the back side of the LED light sources 8. The LED light sources 8 may be monochromatic light sources of three primary colors, i.e., RGB (red, green, blue). Alternatively, the LED light sources 8 may be white light sources. The backlight unit 12 is not limited to the direct type but may be an edge-lighting type.

Furthermore, a light source, such as a wide-color-gamut fluorescent lamp (cold-cathode fluorescent lamp, CCFL), having an NTSC ratio of 90% or more may be used in place of the LED light sources. The use of the LEDs or the wide-color gamut CCFL as the backlight source improves the color reproducibility of an image displayed on the liquid-crystal panel 11, thus displaying a higher-definition, higher-quality image.

Figure 5:
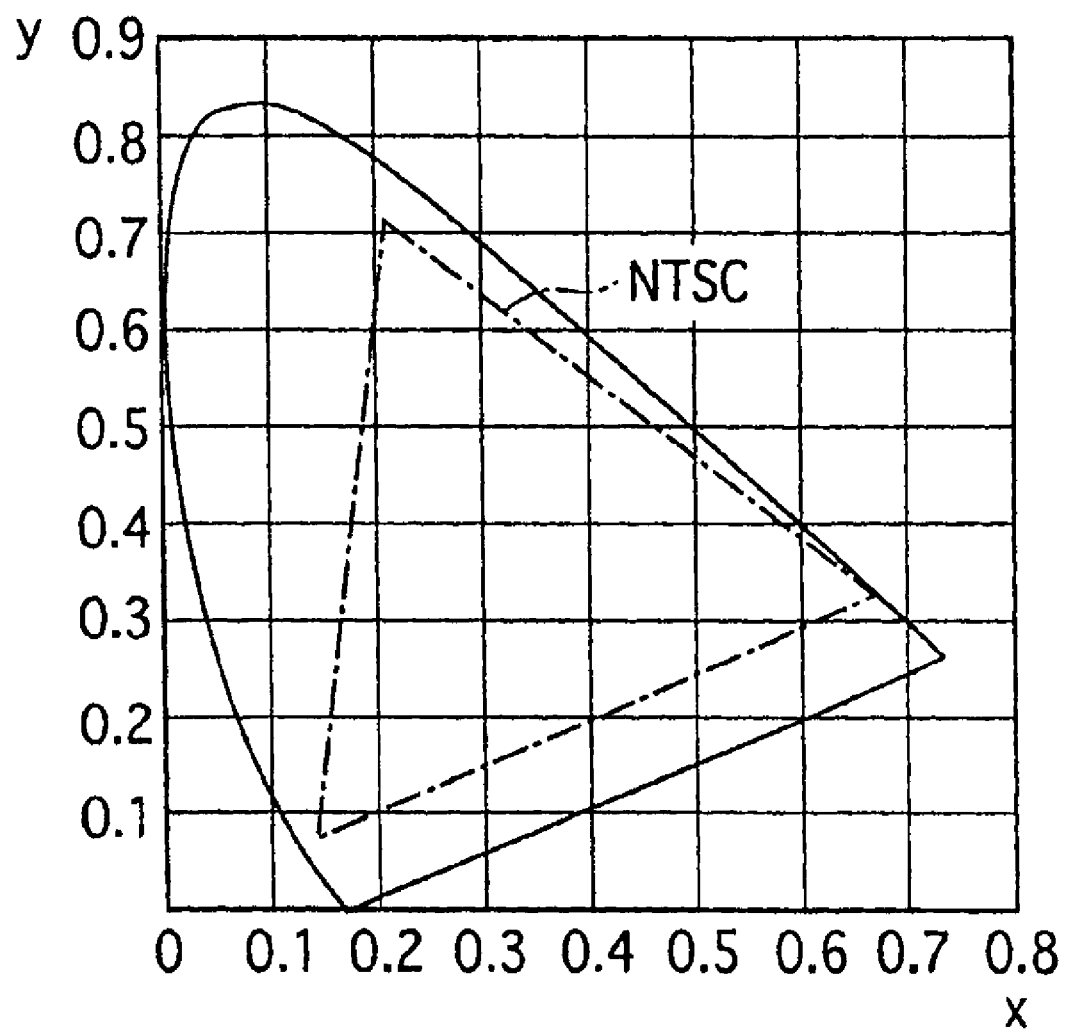
FIG. 5 is a graph showing chromaticity coordinates, the graph illustrating the NTSC ratio of a light source.

The term "NTSC ratio" refers to the area ratio of a color reproduction range to an x,y chromaticity range according to the National Television System Committee (NTSC) system. FIG. 5 is a Commission Internationale de l'Eclairage (CIE) standard colorimetric system chromaticity diagram. In a display, a value obtained by dividing the area of a triangle obtained by measuring the chromaticity of each of the RGB colors and then plotting the resulting measurements on a chromaticity diagram by the area of a triangle obtained by RGB chromaticity points defined by the NTSC system is used as the NTSC ratio.

In such a wide-color-gamut light source, in particular, an emission spectrum of red light shifts toward long wavelengths compared with known light sources (NTSC ratio: 65% to 75%). As a result, in the use of such wide-color-gamut light sources in known liquid-crystal panels or known liquid-crystal displays, a visible light component emitted from the panel in an oblique direction and having a wavelength of 600 nm or more has an emission intensity higher than that of a visible light component having a shorter wavelength, thereby increasing a dependence on a viewing angle. In particular, when the panel is viewed from an oblique direction, the entire image area tends to redden. Furthermore, the emission intensity of a blue component decreases as an exit angle increases. Thus, a color temperature also tends to decrease in addition to reddening.

FIG. 6 shows experimental data for making a comparison of viewing-angle properties between the known low-NTSC-ratio CCFL light source (NTSC ratio: 65% to 75%) and an LED light source (NTSC ratio: 90% or more). The axis of ordinate indicates a color difference $\Delta xy$. The axis of abscissa indicates a viewing angle $\phi$ (see FIG. 2) with respect to a direction normal to the liquid-crystal panel. The color difference $\Delta xy$ means a change in the color tone of an image between two directions and is calculated with the following formula:

$$\Delta xy = \sqrt{\{(x0-x1)^2 + (y0-y1)^2\}}$$

where x0 and y0 represent chromaticity coordinates in the front direction ($\phi=0°$); and x1 and y1 represent chromaticity coordinates at an angle $\phi$. The experiment was performed on a viewing angle measurement (model EZ-Contrast, manufactured by ELDIM).

As is apparent from the example shown in FIG. 6, the liquid-crystal display including the wide-color-gamut light source indicated by curved line 1 has a large amount of the change in color difference $\Delta xy$ and an increased dependence on the viewing angle to the panel thereof, as compared with the liquid-crystal display including the known low-NTSC-ratio light source indicated by curved line 2.

When the optical filter 4 having the structure described above was disposed on the front face of the liquid-crystal panel of the liquid-crystal display including the wide-color-gamut light source having such properties, the amount of the change in $\Delta xy$ indicated by curved line 3 in response to the viewing angle $\phi$ was suppressed compared with the known light source.

At a viewing angle $\phi$ of 80°, the known low-NTSC-ratio light source had a color difference $\Delta xy$ of 0.023, the wide-color-gamut light source had a color difference $\Delta xy$ of 0.032, and the wide-color-gamut light source provided with the optical filter 4 of the present embodiment had a color difference $\Delta xy$ of 0.021.

The effects of this embodiment are described below.

Referring to FIG. 1, light emitted from the LED light sources 8 of the backlight unit 12 is incident on the liquid-crystal panel 11 through the diffusing plate 13, a prismatic sheet 14, the diffusing sheet 15, and the polarization component separating element 16.

The diffusing plate 13 functions to scatter light incident from the backlight in such a manner that bright lines of the backlight unit 12 are not viewed from the front face of the liquid-crystal panel 11. The prismatic sheet 14 converges light scattered by the diffusing plate 13. The diffusing sheet 15 scatters the converged light in a predetermined angle range. The polarization component separating element 16 transmits a predetermined linearly polarized light (for example, a P wave) and reflects another linearly polarized light (for example, an S wave) contained in the incident light. Thereby, only a predetermined polarized light is incident on the liquid-crystal panel 11.

The polarized light emitted from the polarization component separating element 16 is incident on the liquid-crystal layer 1 through the polarizing plate 3b having a transmission axis parallel to the polarization direction. The orientation of the liquid-crystal molecules constituting the liquid-crystal layer 1 is controlled by voltage-driving each of the pixel regions between the transparent electrodes film 18a and 18b (FIG. 2), thereby optically rotating the incident polarized light. Therefore, after the light passes through the color filter 17, a light component passing through the polarizing plate 3a disposed on the front face side of the liquid-crystal panel and a light component not passing through the polarizing plate 3a are controlled on a pixel to pixel basis to form a color image on the front face of the liquid-crystal panel 11.

The optical filter 4 disposed at the forward end of the liquid-crystal panel 11 has a transmittance for a visible light component that travels in an oblique direction lower than the transmittance for a visible light component that travels toward the front ($\phi=0$ in FIG. 2), both of the visible light components having a wavelength of 600 nm or more in a red wavelength region among light components for forming an image. In particular, the transmittance for the visible light component decreases in substantial proportion to the angle of incidence 0 (FIG. 3) with respect to the optical filter 4. As indicated by curved line 3 shown in FIG. 6, the amount of the change in color difference $\Delta xy$ with respect to the viewing angle $\phi$ can be suppressed.

Figure 7A:
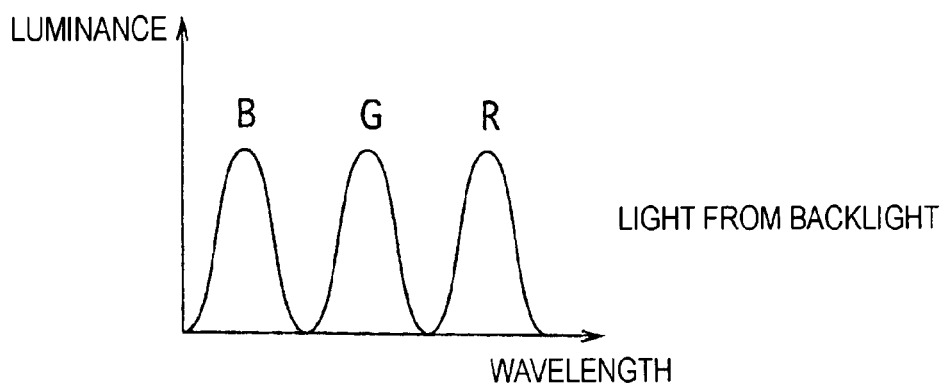
FIGS. 7A to 7C are each a graph showing the emission spectrum of light from a backlight, the graphs illustrating an effect of the optical filter 4.
Figure 7B:
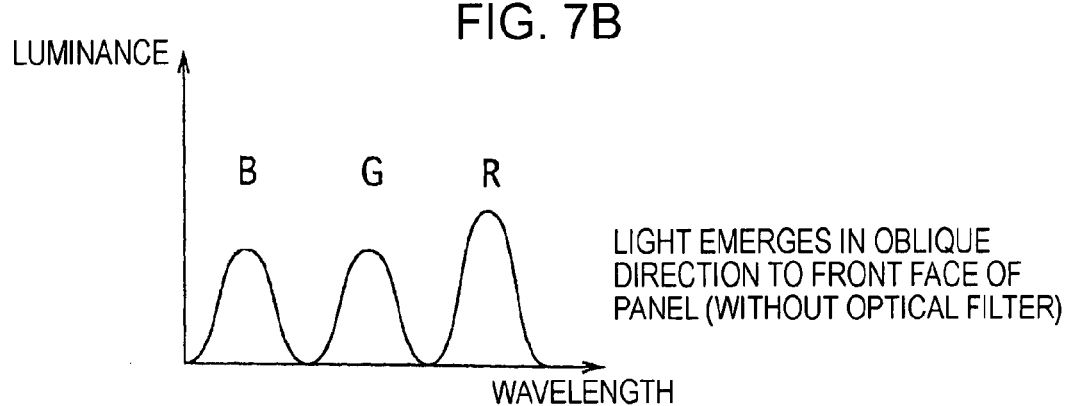
Figure 7C:
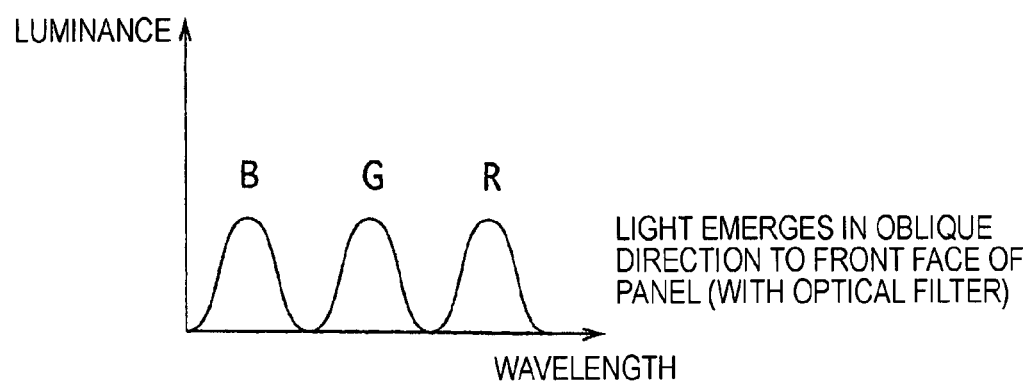

FIGS. 7A to 7C schematically show the emission spectra of light from the backlight and light from the panel.

The RGB light components emitted from the backlight unit 12 are the same luminance level (FIG. 7A). The luminance (intensity) of light emitted from the backlight unit 12 decreases through the diffusing plate 13, the prismatic sheet 14, the diffusing sheet 15, the polarization component separating element 16, the polarizing plates 3a and 3b, the color filter 17, and the like before the passage of the liquid-crystal panel 11.

The light component that travels toward the front of the panel differs in emission spectrum from the light that travels in an oblique direction to the panel because of these optical sheets and the refractive-index anisotropy of the liquid-crystal layer 1. When the wide-color-gamut light source, such as an LED, is used as the backlight, the light component that travels in an oblique direction to the panel has the luminance of the R component higher than those of B and G components (FIG. 7B). The optical filter 4 selectively suppresses the transmittance of the R component of the visible light component that travels in the oblique direction to increase the uniformity in the luminance of each RGB component (FIG. 7C).

According to this embodiment, the optical filter 4 can selectively reduce the transmittance for longer wavelength light having a wavelength of 600 nm or more in response to an exit angle. Thus, reddening of the entire image area when viewed from an oblique direction can be effectively inhibited. Furthermore, the optical filter 4 has a transmittance that decreases in substantial proportion to the exit angle of light, thus reducing a color difference due to the difference of a viewing angle to the liquid-crystal panel 11 and improving viewing angle properties such as display colors and display contrast.

According to this embodiment, the optical filter 4 is disposed at the outgoing-light-side face of one of the pair of the transparent substrates 2a and 2b opposite to each other with the liquid-crystal layer 1 provided therebetween. Thus, the optical filter 4 can be easily designed in response to the quality of an image displayed on the liquid-crystal panel.

Figure 8A:
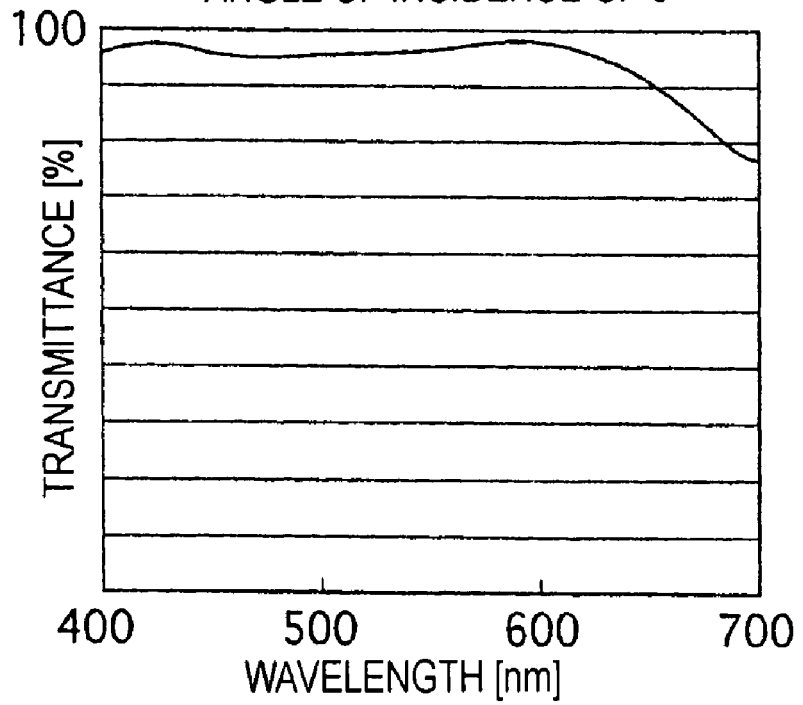
FIGS. 8A and 8B are each a graph showing the relationship between the transmittance and the wavelength, the graphs illustrating an example of the optical filter 4.
Figure 8B:
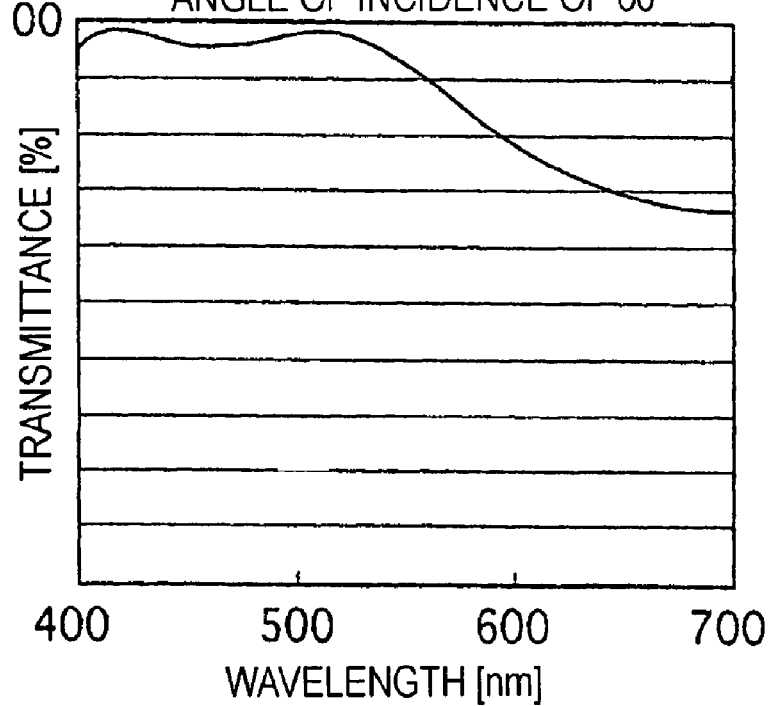

The inventors measured viewing angle properties of a liquid-crystal panel including an optical filter having transmittance properties shown in FIGS. 8A and 8B, the filter being attached to the forward end of the liquid-crystal panel. FIG. 8A shows the relationship between the transmittance and the wavelength at an angle of incidence of 0°. FIG. 8B shows the relationship between the transmittance and the wavelength at an angle of incidence of 60°.

This optical filter is designed such that the transmittance for a visible light component having a wavelength between 400 and 650 nm at an angle of incidence of 0° is 70% or more and such that the transmittance for a visible light component having a wavelength of 600 nm or more at an angle of incidence of 60° is about 70% of the average transmittance for the visible light component having a wavelength between 450 and 550 nm. The results of experiments demonstrated that the color difference between the front direction and the oblique direction was satisfactory, and no reddening of the image area was observed when viewed from the oblique direction.

Second Embodiment

Figure 9:
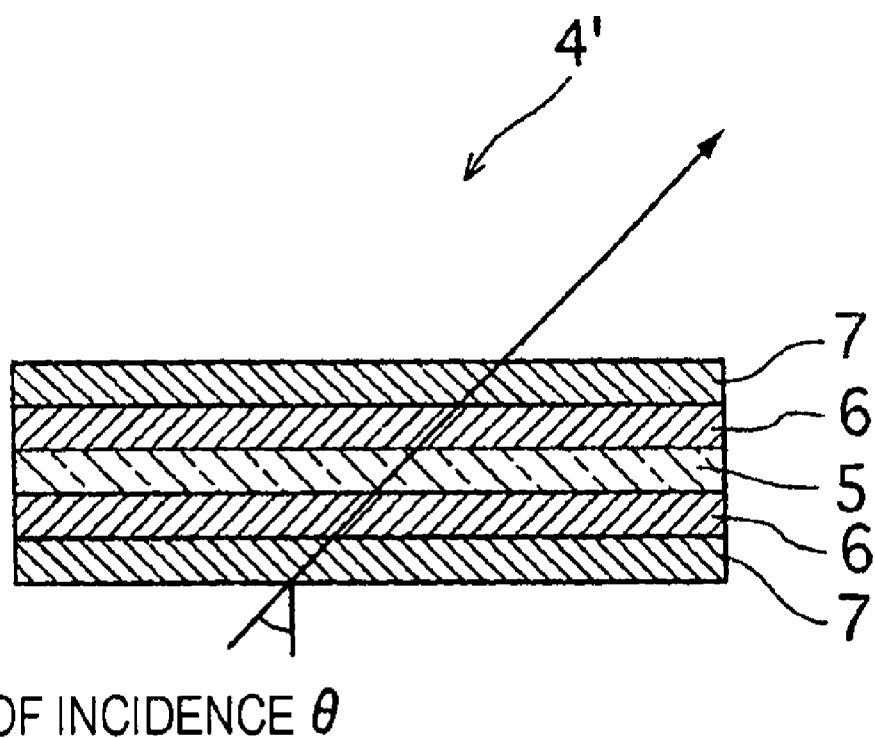
FIG. 9 is a cross-sectional view illustrating the structure of an optical filter 4' according to a second embodiment.

FIG. 9 shows an example of the structure of an optical filter 4' according to a second embodiment of the present invention. The optical filter 4' of this embodiment has a dielectric multilayer in which the high-refractive-index material layer 6 and the low-refractive-index material layer 7 are stacked in that order on each face of the transparent support 5 formed of a transparent plastic film such as PET film having a transmittance of 90% or more.

In this embodiment, the high-refractive-index material layer 6 is a coating film (refractive index: 1.94) containing fine particles composed of $TiO_2$. The low-refractive-index material layer 7 is a fluorocarbon resin film (refractive index: 1.35). The high-refractive-index material layer 6 may be a coating film containing fine particles composed of $Nb_2O_5$, $Ta_2O_5$, $ZrO_2$, or the like. In the exemplary structure shown in FIG. 9, the multilayer in which the number of layers stacked on one face of the transparent support 5 is identical to the number of layers stacked on the other face provided. Alternatively, the number of layers stacked on one face may be different from the number of layers stacked on the other face.

In the optical filter 4' having the structure described above, the relationship between the angle of incidence and the transmittance for a light component having a wavelength of 600 nm or more can be mainly adjusted according to thicknesses, the number of layers stacked, a combination of the thicknesses, and the like of the refractive-index material layers 6 and 7. In this embodiment, the first high-refractive-index material layer 6 having a thickness of about 128 nm and the second low-refractive-index material layer 7 having a thickness of about 93 nm are disposed on the transparent support 5.

In the optical filter 4' having the above-described structure, the transmittance for a visible light component having a wavelength of 600 nm or more decreases as an angle of incidence increases. In particular, the optical filter 4' has an average transmittance for a visible light component having a wavelength between 600 nm and 650 nm lower than the average transmittance for a visible light component having shorter wavelengths, both of the visible light components being incident at an angle of incidence of 60°.

Furthermore, the optical filter 4' has a minimum transmittance of 90% or more and an average transmittance of 95% or more with respect to a visible light component having a wavelength between 400 nm and 650 nm and being incident on the optical element 4' at an angle of incidence of 0°.

The optical filter 4' according to this embodiment can also offer the same effect as in the first embodiment described above. That is, reddening of the entire image area when the liquid-crystal panel is viewed from an oblique direction can be effectively inhibited. Furthermore, the transmittance for light that travels toward the front is significantly high, thus inhibiting a reduction in luminance of the display.

Figure 10A:
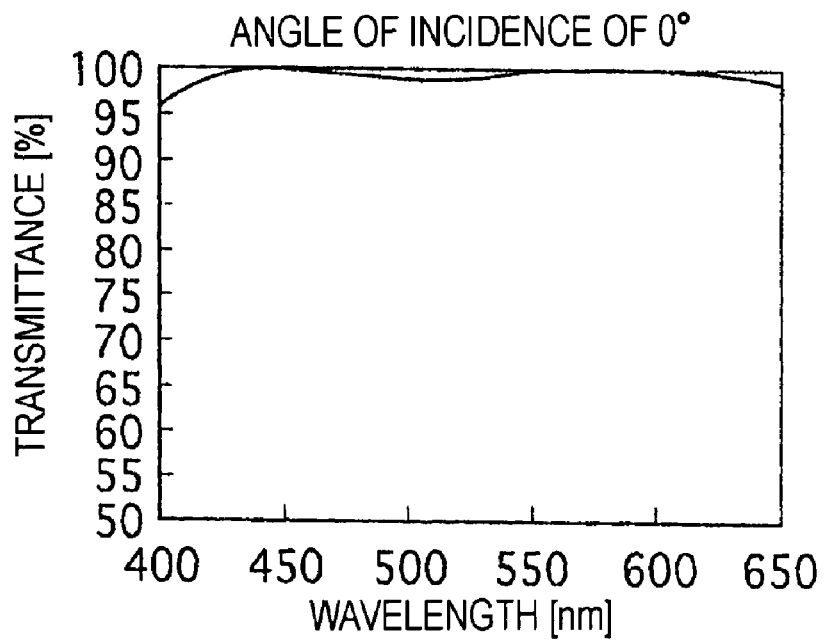
FIGS. 10A and 10B are each a graph showing the relationship between the transmittance and the wavelength, the graphs illustrating an example of the optical filter 4'.
Figure 10B:
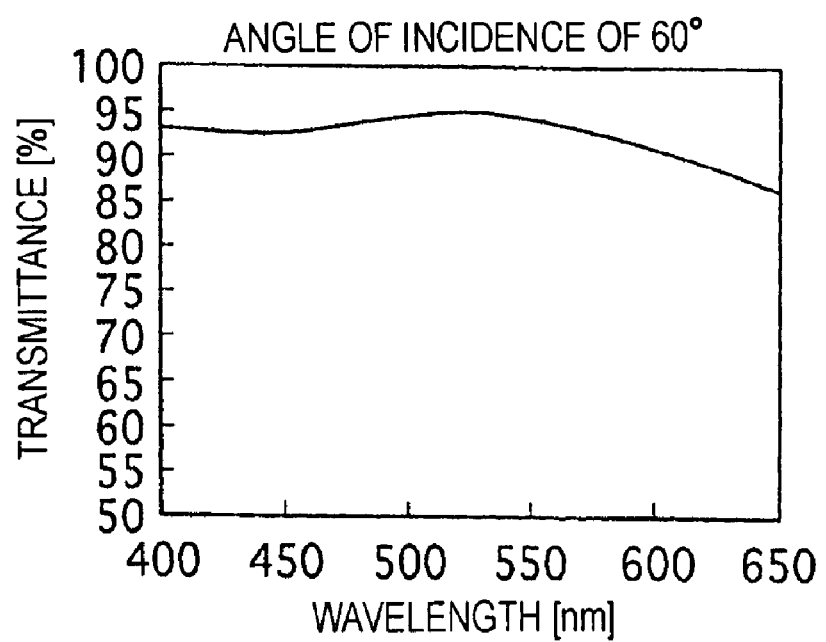

FIGS. 10A and 10B each show optical properties of the optical filter 4' having the above-described structure. FIG. 10A shows the relationship between the transmittance and the wavelength at angle of incidence of 0°. FIG. 10B shows the relationship between the transmittance and the wavelength at angle of incidence of 60°. The optical filter 4' is designed such that the transmittance for a visible light component having a wavelength between 400 and 650 nm at an angle of incidence of 0° is 97% or more and such that the transmittance for a visible light component having a wavelength of 600 nm or more at an angle of incidence of 60° is lower than the average transmittance for the visible light component having a wavelength between 450 and 600 nm. An experiment for measuring viewing-angle properties of a liquid-crystal panel provided with the optical filter 4' having such optical properties attached to the forward end thereof was conducted. The results demonstrated that the color difference between the front direction and the oblique direction was satisfactory, and no reddening of the image area was observed when viewed from the oblique direction.

Third Embodiment

Figure 11:
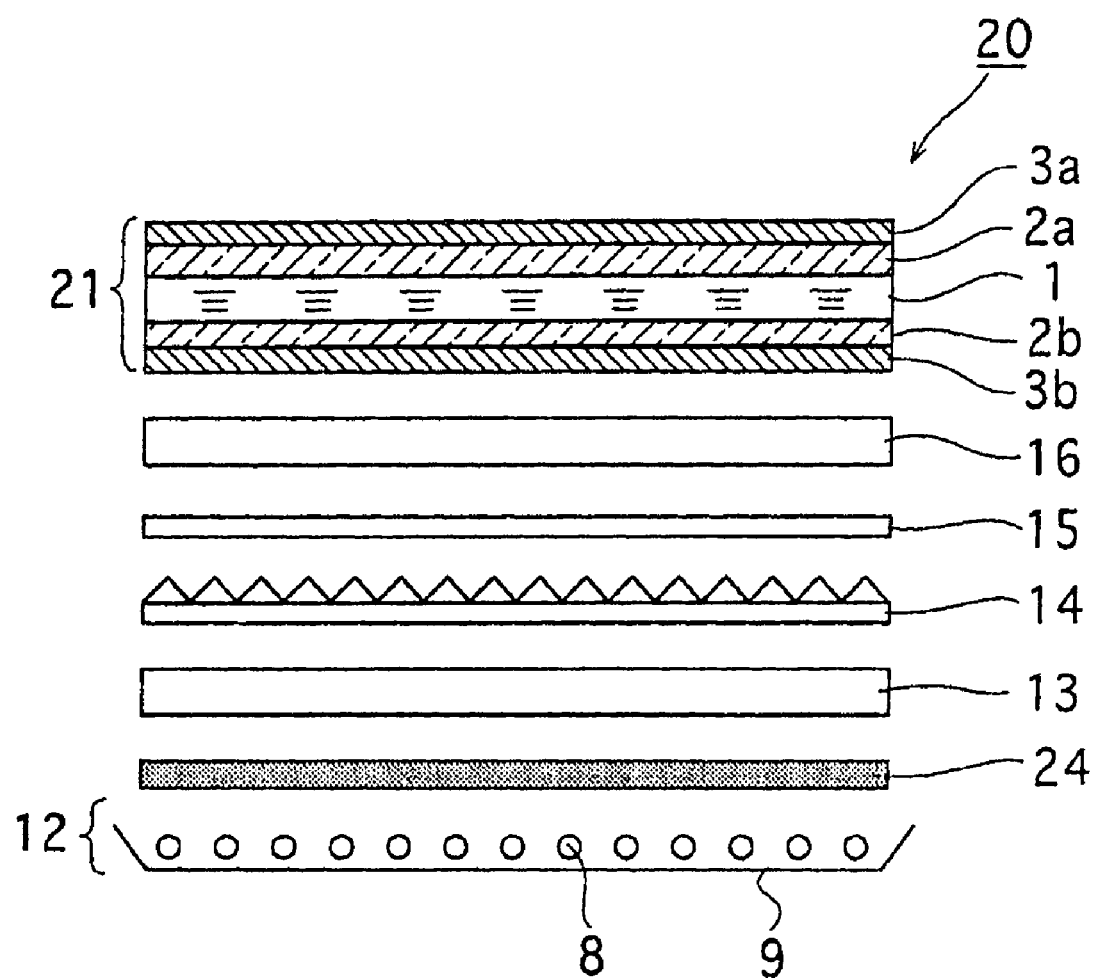
FIG. 11 is a schematic diagram of a liquid-crystal display 20 according to a third embodiment.

FIG. 11 shows a liquid-crystal display 20 according to a third embodiment. In the drawings, elements corresponding to the elements in the first embodiment are designated using the same reference numerals, and detailed description is not repeated.

In this embodiment, a liquid-crystal panel 21 includes a pair of transparent substrates 2a and 2b opposite each other with a liquid-crystal layer 1 provided therebetween; and a pair of polarizing plates 3a and 3b disposed on the outer sides of the respective transparent substrates 2a and 2b. According to need, optical compensating films, such as retardation films, may be disposed between the transparent substrate 2a and the polarizing plate 3a and between the transparent substrate 2b and the polarizing plate 3b.

An optical filter 24 is disposed between the backlight unit 12 and the diffusing plate 13. The optical filter 24 has the same structure as the optical filters 4 and 4' described in the first and second embodiments. The optical filter 24 has a transmittance for a visible light component that travels in an oblique direction lower than the transmittance for a visible light that travels toward the front, both of the visible light components being emitted from the backlight unit 12 and having a wavelength of 600 nm or more.

In this embodiment, the intensity of a light component having longer wavelengths of light components emitted from the light source is selectively reduced by locating the optical filter 24 on the outgoing-light-side face of the backlight unit 12, and then the resulting light component is guided to the subsequent diffusing plate 13, the prismatic sheet 14, the diffusing sheet 15, the polarization component separating element 16, and the liquid-crystal panel 21. The intensity of the light component having longer wavelengths and emerging from the front face of the liquid-crystal panel 21 in an oblique direction is reduced with the optical filter 24 in advance, thereby inhibiting reddening of an image area when the liquid-crystal panel 21 is viewed from an oblique direction.

The optical filter 24 may have the same structure as the optical filters 4 and 4' described in the first and second embodiments but is preferably optimized in response to properties of an image displayed on the liquid-crystal panel 21. The inventors changed the thickness of the refractive-index-material layer constituting the optical filter 24 to produce a filter such that a transmittance for a visible light component having a wavelength of 600 nm or more at angle of incidence of 0° is 90% of the average transmittance for a visible light component having a wavelength between 450 and 550 nm. An experiment for measuring viewing-angle properties of the liquid-crystal panel 21 was conducted. The results demonstrated that the color difference between the front direction and the oblique direction was satisfactory, and no reddening of the image area was observed when viewed from the oblique direction.

Fourth Embodiment

Figure 12:
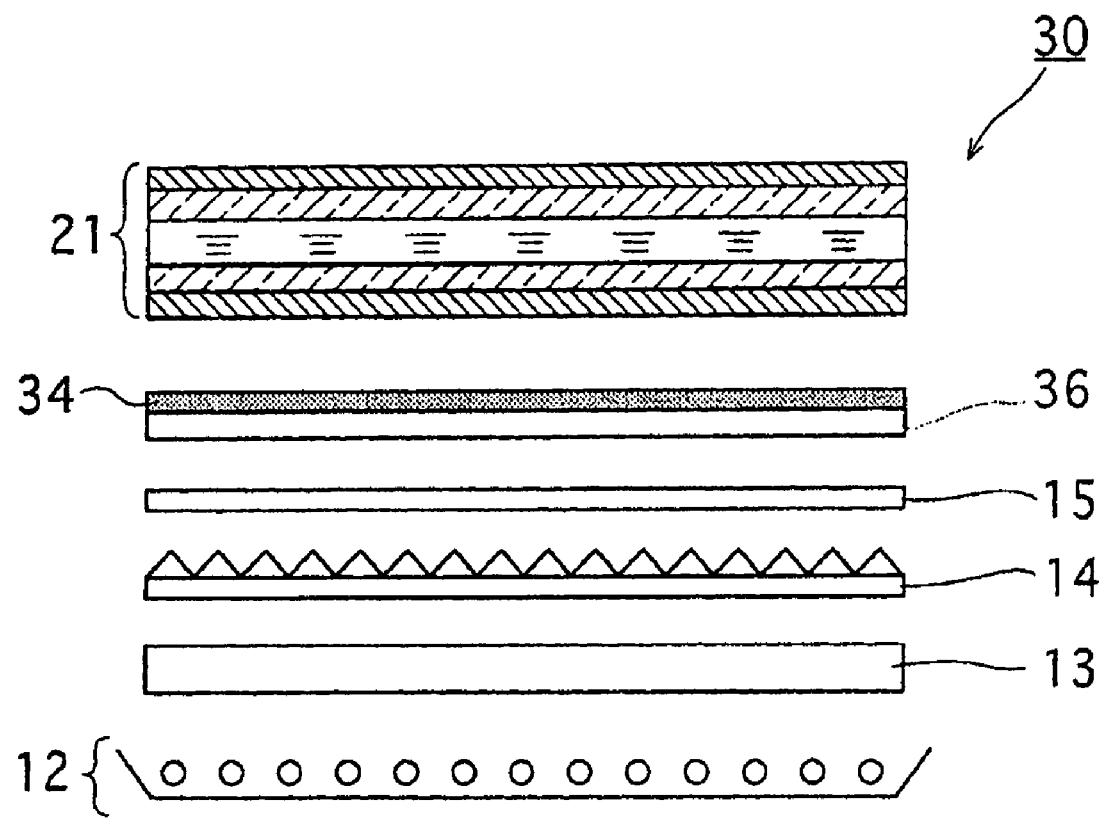
FIG. 12 is a schematic diagram of a liquid-crystal display 30 according to a fourth embodiment.

FIG. 12 shows a liquid-crystal display 30 according to a fourth embodiment. In the drawings, elements corresponding to the elements in the third embodiment described above are designated using the same reference numerals, and detailed description is not repeated.

In the liquid-crystal display 30 according to this embodiment, an optical filter 34 is disposed between the liquid-crystal panel 21 and the backlight unit 12, the optical filter 34 being integral with a polarization component separating element 36.

Figure 13:
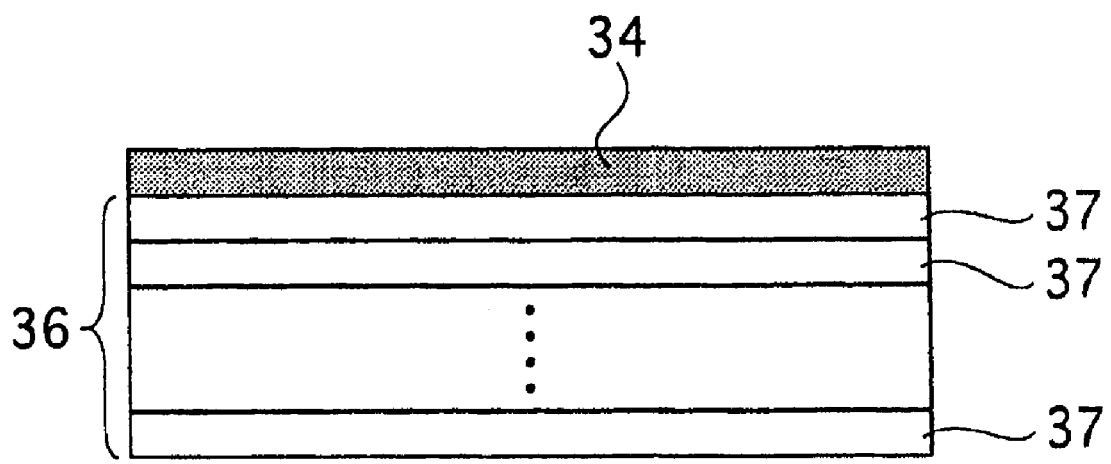
FIG. 13 is a cross-sectional view of an example of the structure of a polarization component separating element 36.

As schematically shown in FIG. 13, the polarization component separating element 36 includes a plurality of reflective polarizers 37, the reflective polarizers 37 being stacked. For example, the polarization component separating element 36 is an optical functional element for transmitting a P-wave polarization component and reflecting a S-wave polarization component of light emitted from the backlight unit 12. In this embodiment, the optical filter 34 is integrally disposed on the outgoing-light-side face of the polarization component separating element 36.

The optical filter 34 has the same structure as the optical filters 4 and 4' in the first and second embodiments described above. The optical filter 34 has a transmittance for a visible light component that travels in an oblique direction lower than the transmittance for a visible light component that travels toward the front of the liquid-crystal panel 21, both of the visible light components emerging from the polarization component separating element 36 and having a wavelength of 600 nm or more.

Also in this embodiment having the structure described above, the same effect as in the above-described embodiments can be obtained. In particular, according to this embodiment, since the optical filter 34 is integrally disposed on the optical functional element such as polarization component separating element 36, the liquid-crystal display can be produced without an increase in the number of elements.

The polarization component separating element 36 is not limited to the structure shown in FIG. 13. For example, the polarization component separating element 36 may have a structure in which first and second prismatic substrates each including a structural surface with continuous grooves each having a triangular cross section are opposite each other with a dielectric layer in such a manner that each peak and each valley of the first substrate correspond to a corresponding one of the peak and valley, respectively, of the second substrate. The optical functional element integrally disposed on the optical filter 34 is not limited to the polarization component separating element but may be the prismatic sheet 14, the diffusing sheet 15, and the like.

EXAMPLES

Illustrative examples of the present embodiments are described below. However, the embodiments are not limited to these examples.

Some samples of optical filters as optical elements were produced. The thickness, the number of layers stacked, and the stacking structure of a refractive-index-material layer constituting the optical filter were changed. The relationship between the transmittance and the wavelength was measured at angles of incidence of 0° and 60°.

A high-refractive-index-material layer used for the sample production was a film containing fine particles composed of $TiO_2$. The composition of Coating A constituting the coating film is described below.

(Coating A)

Pigment fine particles: $TiO_2$ fine particles, 100 parts by weight, (manufactured by Ishihara Sangyo Kaisha, Ltd., average particle size: about 20 nm, refractive index: 2.48)

Binder: a $SO_3Na$ group-containing urethane acrylate, 9.2 parts by weight, (number-average molecular weight: 350, $SO_3Na$ concentration: $1\times10^{-1}$ mol/g)

Dispersant: a polyoxyethylene phosphate, 7.5 parts by weight

Organic solvent: methyl isobutyl ketone (MIBK), 4800 percent by weight

Ultraviolet-curable (UV-curable) resin: a mixture of dipentaerythritol hexaacrylate and dipentaerythritol pentaacrylate, 22 parts by weight, (trade name: DPHA, manufactured by Nippon Kayaku Co., Ltd.)

Predetermined amounts of the pigment fine particles, the dispersant, the binder, the organic solvent were mixed. The resulting mixture was subjected to dispersing treatment with a paint shaker to form a dispersion containing fine particles. The UV-curable resin was added thereto. The resulting mixture was stirred with a stirrer to form Coating A. The refractive index of an optical film formed from Coating A was measured with a Filmetrix (manufactured by Matsushita Intertechno Co., Ltd.) and was 1.94 on average in a visible range.

The low-refractive-index-material layer used for the sample production was a fluorocarbon resin film. The composition of Coating B for forming the resin film is described below.

(Coating B)

Binder: a polymer from a carboxyl group-terminated perfluorobutenyl vinyl ether, 100 parts by weight Organic solvent: a mixed solvent of a fluorine-containing alcohol ($C_6F_{13}C_2H_{40}H$) and perfluorobutylamine (mixing ratio=95:5), 1666 parts by weight The binder and the organic solvent were mixed and sufficiently stirred to form Coating B. The refractive index of an optical film formed from Coating B was measured with a Filmetrix (manufactured by Matsushita Intertechno Co., Ltd.) and was 1.34 on average in a visible range.

Example 1

Optical Film Samples were Produced with Coatings A and B in the Following Way

Coating A was applied by dipping on a main surface of a PET film (thickness: 188 μm, trade name: U426, manufactured by Toray Industries Inc). The amount of Coating A applied was controlled by adjusting the withdrawing speed of the substrate and was determined in such a manner that a target thickness of 128 nm was achieved. The resulting coating film of Coating A was dried at 80° C. and UV-cured (1,000 mJ/cm$^2$) to form a high-refractive-index-material layer.

Coating B was applied by dipping the resulting high-refractive-index-material layer. The amount of Coating B applied was controlled by adjusting the withdrawing speed of the substrate and was determined in such a manner that a target thickness of 93 nm was achieved. The resulting coating film was dried at room temperature and thermally cured at 90° C. to form a low-refractive-index-material layer. In this way, four layers in total were stacked on both surfaces of the PET film.

The resulting samples were evaluated by measuring transmittances at angles of incidence of 0° and 60° with a spectroreflectometer. An average transmittance and a minimum transmittance at a wavelength between 400 and 600 nm and an average transmittance at a wavelength between 600 and 650 nm were determined. Furthermore, transmittances at angles of incidence of 0°, 10°, 20°, and 30° were measured, and then an average transmittance at a wavelength between 400 and 450 nm was determined.

Examples 2 to 6

Table 1 summarizes the thickness, the number of layers stacked, and the stacking structure of each refractive-index-material layer of a corresponding one of the samples in EXAMPLE 2 to 6. In EXAMPLE 2, the low-refractive-index-material layer was formed alone (in this case, the PET substrate corresponded to the high-refractive-index-material layer (refractive index: about 1.65)). In each of EXAMPLES 3 to 6, a high-refractive-index-material layer and a low-refractive-index-material layer were further formed on the (second) low-refractive-index-material layer.

TABLE 1

| EXAMPLE | Thickness of first layer [nm] (high-refractive-index layer) | Thickness of second layer [nm] (low-refractive-index layer) | Thickness of third layer [nm] (high-refractive-index layer) | Thickness of fourth layer [nm] (low-refractive-index layer) |
|---|---|---|---|---|
| 1 | 128 | 93 | 0 | 0 |
| 2 | 0 | 93 | 0 | 0 |
| 3 | 0 | 186 | 128 | 93 |
| 4 | 122 | 178 | 122 | 89 |
| 5 | 117 | 189 | 117 | 95 |
| 6 | 0 | 179 | 115 | 78 |

Figure 14:
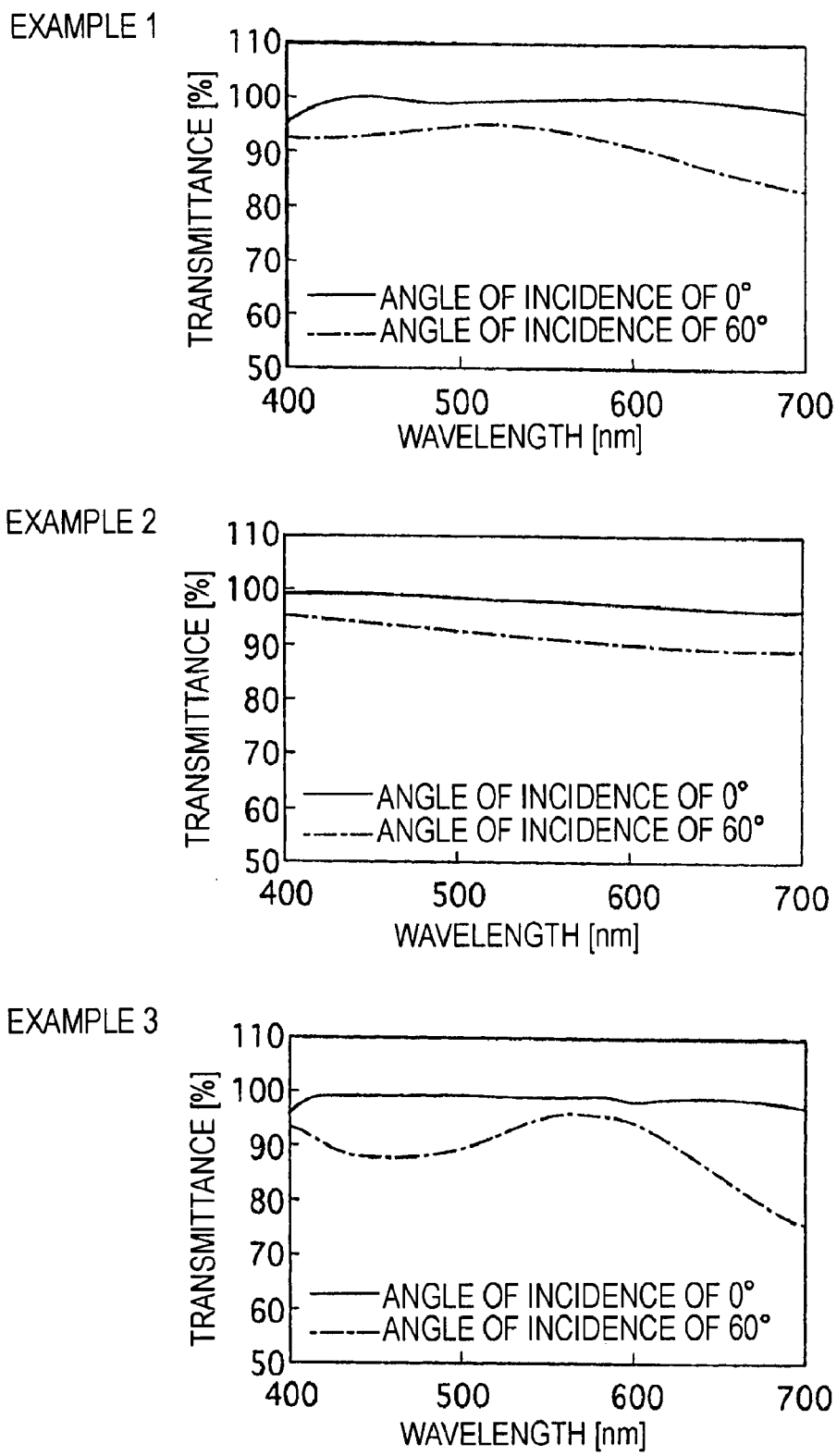
FIG. 14 shows graphs each showing the relationship between the transmittance and the wavelength of a sample in each of EXAMPLES 1 to 3.

Tables 2 and 3 and FIGS. 14 and 15 show the results of measurement for the transmittances of the samples in examples. In each of the samples, the minimum transmittance for a visible light component having a wavelength between 400 nm and 650 nm at an angle of incidence of 0° was 90% or more, and the average transmittance for the visible light component was 95% or more. Furthermore, the average transmittance for a visible light component having a wavelength between 600 nm and 650 nm at an angle of incidence of 60° was lower than the average transmittance for a visible light component having a wavelength between 400 nm and 600 nm. Moreover, the average transmittance at a wavelength between 400 and 450 nm at angles of incidence of 10°, 20°, and 30° was higher than the average transmittance at a wavelength between 400 and 450 nm at an angle of incidence of 0°.

TABLE 2

| | Measurement result at angle of incidence of 0° | | Measurement result at angle of incidence of 60° | |
|---|---|---|---|---|
| EXAMPLE | Average transmittance [%] between 400 and 650 nm | Minimum transmittance [%] between 400 and 650 nm | Average transmittance [%] between 400 and 600 nm | Average transmittance [%] between 600 and 650 nm |
| 1 | 99.4 | 96.3 | 93.4 | 88.8 |
| 2 | 98.7 | 97.7 | 94.4 | 89.5 |
| 3 | 98.8 | 95.8 | 91.6 | 90.6 |
| 4 | 98.9 | 97.8 | 90.39 | 81.9 |
| 5 | 98.9 | 96.7 | 92.4 | 82.5 |
| 6 | 98.9 | 95.7 | 90.8 | 75.8 |

TABLE 3

| EXAMPLE | Average transmittance [%] at wavelength between 400 and 450 nm at angle of incidence of 0° | Average transmittance [%] at wavelength between 400 and 450 nm at angle of incidence of 10° | Average transmittance [%] at wavelength between 400 and 450 nm at angle of incidence of 20° | Average transmittance [%] at wavelength • between 400 and 450 nm at angle of incidence of 30° |
|---|---|---|---|---|
| 1 | 98.86 | 98.96 | 99.2 | 99.2 |
| 2 | 98.42 | 98.5 | 98.7 | 98.9 |
| 3 | 98.36 | 98.5 | 98.8 | 99 |
| 4 | 99.28 | 99.36 | 99.49 | 99.30 |
| 5 | 97.5 | 97.7 | 98.2 | 98.9 |
| 6 | 97.65 | 97.8 | 98.3 | 98.5 |

Figure 16:
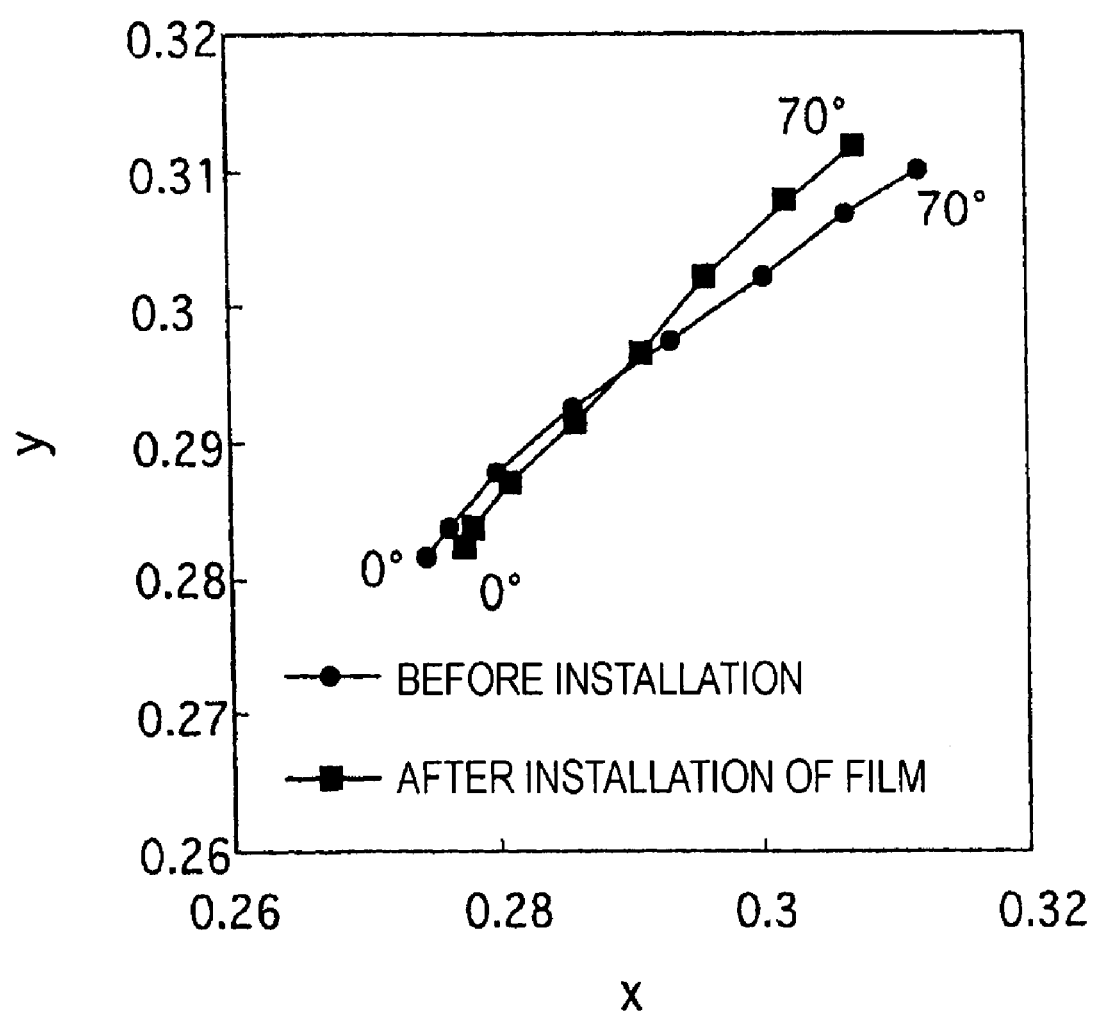
FIG. 16 shows experimental results demonstrating a change in chromaticity before and after installation of a sample according to EXAMPLE 5.

With respect to EXAMPLE 5, in a liquid-crystal television set actually including an LED backlight, the optical element sample was installed between the liquid-crystal panel and the prismatic sheet. A change in the chromaticity of the display in response to a viewing angle was measured with a spectral radiance meter (CA1000, manufactured by Konica Minolta Holdings, Inc). FIG. 16 shows the results. In EXAMPLE 5, the amount of the change in the chromaticity Δxy of the display in response to the change in viewing angle decreased compared with the case without the film. Furthermore, the chromaticity shifted to a direction in which the direction y of the chromatic change increases, i.e., a direction in which redness is eliminated. That is, according to an embodiment, both of the changes in color temperature and reddening were inhibited.

Certain examples of the embodiments have been described. However, the present embodiments are not limited to these examples. Various modifications may be made without deporting from the spirit and scope of the present disclosure.

In the embodiments described above, for example, the optical filter has a low transmittance for a visible light component having a wavelength of 600 nm or more. However, the present invention is not limited thereto. For example, in a liquid-crystal display including a backlight unit without a wide-color-gamut light source, in some cases, outgoing light components of yellow, orange, green, and the like other than red become problematic. In this case, the designing of the optical filter for these wavelength ranges can inhibit coloring due to a specific color when the display is viewed from an oblique direction.

In the first embodiment, an antireflective function may be imparted by the formation of a dielectric layer having a relatively low refractive index or a dielectric multilayer including a high-refractive-index-material layer and a low-refractive-index-material layer on the front face of the optical filter 4 (the upper-face side of the transparent support 5 in FIG. 3).

Figure 17:
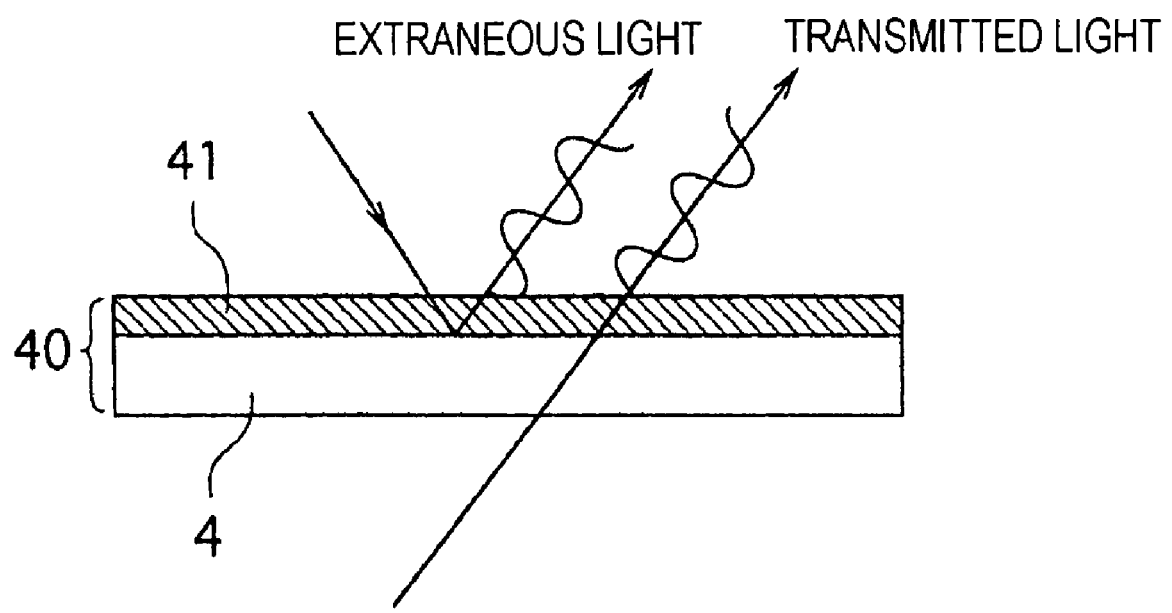
FIG. 17 illustrates an exemplary modification of the structure of an optical element according to an embodiment.

As shown in FIG. 17, an optical element 40 including a dielectric film (optical layer) 41 having a single layer or a multilayer disposed on the front face of the optical filter 4 may be formed in such a manner that a light component passing through the optical filter 4 and having a specific wavelength range (for example, a wavelength of 600 nm or more) is weakened by interference with a specific wavelength component of extraneous light (for example, a wavelength of 600 nm or more) reflected from the dielectric film 41. In this case, the dielectric film 41 is designed in such a manner that the phase of the extraneous light reflected is opposite the phase of the light component passing through the optical filter 4 and having a specific wavelength range.

The optical element is disposed at the front-face side of the liquid-crystal panel or at the outgoing-light-side face of the backlight unit. Alternatively, the optical element is integral with the polarization component separating element 16. However, it should be appreciated that in other embodiments the optical element may be disposed at the optimal place where target quality of an image is achieved in response to types, structures, combinations of the optical sheets, such as the diffusing sheet and the prismatic sheet.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The invention claimed is:

1. A liquid-crystal display comprising:
a liquid-crystal panel;
a backlight unit disposed at the back side of the liquid-crystal panel, wherein the backlight unit includes a light source having a NTSC ratio of 90% or more; and
an optical element comprising a dielectric multilayer including a first refractive-index material layer and a second-refractive-index material layer having a refractive index different from the refractive index of the first-refractive-index material layer, which are alternately stacked on a transparent support made of a transparent plastic film, and having different transmittances between a light component that travels in an oblique direction and a light component that emerges from the liquid-crystal panel toward the front, both of the light components being emitted from the backlight unit and having a predetermined wavelength range, wherein each of the light components having the predetermined wavelength range is a visible light component having a wavelength of 600 nm or more, and the liquid-crystal display has a transmittance for the visible light component that travels in an oblique direction lower than the transmittance for the visible light component that emerges from the outgoing-light-side face toward the front wherein the optical element has an average transmittance for a visible light component incident on the optical element at an angle of incidence ranging from 10° to 30° and having a wavelength between 400 nm to 450 nm higher than the average transmittance for a visible light component incident on the optical element at an angle of incidence of incidence of 0° and having a wavelength between 400 nm to 450 nm.

2. The liquid-crystal display of claim 1, wherein the optical element has
an average transmittance for a visible light component having a wavelength between 600 nm and 650 nm lower than the average transmittance for a visible light component having a wavelength of less than 600 nm, both of the visible light components being incident on the optical element at an angle of incidence of 60°.

* * * * *